W. J. BELL.
RAILWAY SWITCH SIGNAL.
APPLICATION FILED FEB. 27, 1911.
1,008,938.
Patented Nov. 14, 1911.
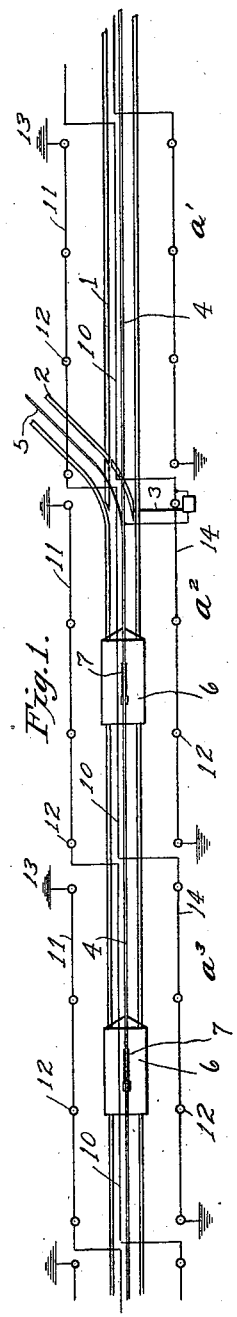
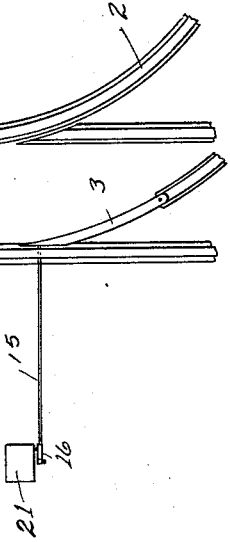
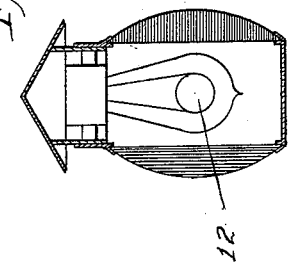
Witnesses:
J. D. Thornburgh.
Lite S. Alten.
Inventor:
Walter J. Bell.

UNITED STATES PATENT OFFICE.

WALTER J. BELL, OF LOS ANGELES, CALIFORNIA, ASSIGNOR TO LOS ANGELES SWITCH AND SIGNAL COMPANY, OF LOS ANGELES, CALIFORNIA, A CORPORATION OF CALIFORNIA.

RAILWAY-SWITCH SIGNAL.

1,008,938. Specification of Letters Patent. Patented Nov. 14, 1911.

Original application filed December 2, 1908, Serial No. 465,728. Divided and this application filed February 27, 1911. Serial No. 611,251.

*To all whom it may concern:*

Be it known that I, WALTER J. BELL, a citizen of the United States, residing at Los Angeles, in the county of Los Angeles and State of California, have invented a new and useful Railway-Switch Signal, of which the following is a specification.

This invention relates to a switch signal shown and described but not claimed in my application, Serial No. 465,728, filed December 2, 1908, on electric block signal system, of which the present application is a division.

The main object of the present invention is to provide a switch signal particularly adapted to electric railways and to operate in conjunction with an electric block signal system such as described in my application above referred to.

Another object of the invention is to provide an electric railway signal in which notification will be given by lighting of lamps at distributed points in a block in advance of the switch so that continuous notification of the condition of the switch will be given to the motorman passing through this block, and liability of accident due to failure of the motorman to notice a single signal or semaphore will be obviated.

Other objects of the invention will appear hereinafter.

The accompanying drawings illustrate the invention, and referring thereto: Figure 1 is a diagrammatic plan of an electric railway provided with my invention. Fig. 2 is a transverse section, adjacent to a switch. Fig. 3 is a plan of the switch. Fig. 4 is a detailed section of one of the lamps.

Fig. 1 illustrates the application of the invention to a single-track electric railway.

1 designates the track rails of a main track and 2, the rails of a branch or turnout, connected to the main track by switch 3.

4 designates the trolley wire for the main track and 5 the trolley wire for the branch.

The cars indicated at 6 are provided with trolleys 7 for collecting current from the trolley wires 4 and 5, and are further provided with motive devices indicated at 8 in Fig. 2, through which current is established from trolley 7, through the usual controlling means not shown, the circuit being completed through the track rails which are grounded.

Each car 6 carries a supplemental trolley 9, running on a main signal wire or conductor, divided into sections 10, corresponding to the block sections $a^1$, $a^2$, $a^3$, etc. The forward end of each main signal wire section is connected to an extension 11 which extends alongside of the track out of the path of the supplemental trolley 9, and includes a series of signal lamps 12, the forward end of this extension conductor 11 being connected to ground at 13. In the case of a single-track railway, another extension 14 leads from the rear end of each main signal wire section and extends alongside the track on the side opposite the extension 11, this extension 14 also including signal lamps 12. The lamps 12 are distributed along the sections in front and rear of the main signal section 10, which overlap as shown, so that each section or block is provided with a main signal section 10, an extension 11 for the next section 10 in advance, and an extension 14 for the next section 10 in the rear.

The manner of operation of the above described devices as a block signal system is set forth in my application above referred to and is not herein described, as the present application relates particularly to the switch signal.

The railway switch 3 is connected, as by means of rod 15, bell-crank 16 and rod 17 to an electric switch 18, one side of which is connected to a branch wire 19, leading to the signal wire section 10, directly at the rear of said switch, the other side of said switch being connected by wire 20 to the trolley wire or supply conductor 4. The switch 18 may conveniently be located on one of the posts 21 which supports the trolley wire 4.

The operation of the switch signal apparatus is as follows: Normally, the switch 18 is open as shown in Fig. 2 and there is, therefore, no current passing to the lamps in the corresponding signal wire section, but when the railway switch 3 is moved to position to open the main track or to cause the car to run on the branch or siding, the electric switch 18 is closed by the operating connections above described, so that current will flow from the supply wire 4 through wire 20, switch 18, and wire 19 to the signal section 14 next in the rear of the track switch 3 and all of the lamps 12 in this signal section are thereby lighted, so that when a car is approaching the switch, which has intentionally or carelessly been left open, the motorman will be notified of the fact that the switch is open or in abnormal position.

What I claim is:

1. A main wire divided into sections, signal wires each connected to its respective section and extending along the adjoining section, a signal on each signal wire, each signal wire being grounded, the signal being between the ground and the main wire section, and a car provided with means for successively supplying electrical energy to the sections of the main wire while the car is on said sections, in combination with a track switch and an electric supply circuit controlled by said track switch to energize the signal for a section adjacent to said switch on operation of said track switch.

2. A main wire divided into sections, signal wires each connected to its respective section and extending along the adjoining section, a plurality of signals distributed along the extension of each signal wire section, each signal wire being grounded, the signals being between the ground and the main wire section, and a car provided with means for successively supplying electrical energy to the sections of the main wire while the car is on said sections, in combination with a track switch and an electric supply circuit controlled by said track switch to energize the signals for a section adjacent to said switch on operation of said track switch.

In testimony whereof, I have hereunto set my hand at Los Angeles, California this 23rd day of January 1911.

WALTER J. BELL.

In presence of—
 Jno. J. Morris,
 J. E. Aultman.

---

Copies of this patent may be obtained for five cents each, by addressing the "Commissioner of Patents, Washington, D. C."